(12) United States Patent
Bang et al.

(10) Patent No.: US 11,646,433 B2
(45) Date of Patent: May 9, 2023

(54) APPARATUS AND PROCESS FOR MAKING ACID-DOPED PROTON EXCHANGE MEMBRANES

(71) Applicant: BLUE WORLD TECHNOLOGIES HOLDING APS, Aalborg Ost (DK)

(72) Inventors: Mads Bang, Stovring (DK); Denys Gromadskyi, Ellidshoj (DK); Jakob Bork, Stovring (DK); Larysa Hromadska, Ellidshoj (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/793,188

(22) PCT Filed: Jan. 12, 2021

(86) PCT No.: PCT/DK2021/050008
§ 371 (c)(1),
(2) Date: Jul. 15, 2022

(87) PCT Pub. No.: WO2021/148090
PCT Pub. Date: Jul. 29, 2021

(65) Prior Publication Data
US 2023/0057508 A1  Feb. 23, 2023

(51) Int. Cl.
*H01M 8/1088* (2016.01)
*C08G 73/18* (2006.01)
*C08J 5/18* (2006.01)
*C08J 7/14* (2006.01)
*H01M 8/103* (2016.01)

(52) U.S. Cl.
CPC ......... *H01M 8/1088* (2013.01); *C08G 73/18* (2013.01); *C08J 5/18* (2013.01); *C08J 7/14* (2013.01); *H01M 8/103* (2013.01); *C08J 2379/04* (2013.01)

(58) Field of Classification Search
USPC .......................................................... 521/27
See application file for complete search history.

(56) References Cited

U.S. PATENT DOCUMENTS

| | | | |
|---|---|---|---|
| 4,927,909 | A | 5/1990 | Wadhwa et al. |
| 5,945,233 | A | 8/1999 | Onorato et al. |
| 6,042,968 | A | 3/2000 | Onorato et al. |
| 7,396,615 | B1 | 7/2008 | Yamamoto |
| 9,705,146 | B2 | 7/2017 | Hsu et al. |
| 10,361,446 | B2 | 7/2019 | Kurungot et al. |
| 2004/0000470 | A1 | 1/2004 | Gentilcore |

(Continued)

FOREIGN PATENT DOCUMENTS

| EP | 1566251 A1 | 8/2005 |
|---|---|---|
| WO | 2000044816 A1 | 8/2000 |

OTHER PUBLICATIONS

Seland F et al.; Improving the performance of high-temperature PEM fuel cells based on PBI eleciolyte. Journal of Power Sources, 160 (2006) pp. 27-36.

(Continued)

*Primary Examiner* — Fred M Teskin
(74) *Attorney, Agent, or Firm* — Brooks Kushman P.C.; John E. Nemazi

(57) ABSTRACT

A continuous automated process and production line for preparing an acid doped polybenzimidazole, PBI, polymer membrane film for use in a fuel cell, the process having a washing stage, a drying procedure, and a doping stage.

10 Claims, 5 Drawing Sheets

(56) References Cited

U.S. PATENT DOCUMENTS

| | | |
|---|---|---|
| 2007/0087248 A1 | 4/2007 | Fujibayashi |
| 2008/0268321 A1 | 10/2008 | Uensal et al. |
| 2008/0280182 A1 | 11/2008 | Uensal et al. |
| 2012/0003564 A1 | 1/2012 | Adachi et al. |
| 2012/0031992 A1 | 2/2012 | Mediavilla |
| 2012/0115050 A1 | 5/2012 | Kim et al. |
| 2014/0284269 A1 | 9/2014 | Kharul et al. |
| 2016/0190625 A1 | 6/2016 | Hsu et al. |

OTHER PUBLICATIONS

Li Q et al.;. High temperature proton exchange membranes based on polybenzimidazole for fuel cells. Progress in Polymer Science, 34 (2009) pp. 449-477.

Li X, et al.; Synthesis and characterization of a new fluorine-containing polybenzimidazole (PBI) for proton-conducting membranes in fuel cells. Fuel Cells, 13 (2013) 832-842.

Shen CH, et al.; Phosphoric acid-doped cross-linked porous polybenzimidazole membranes for proton exchange membrane fuel cells. Journal of Materials Chemistry, 21 (2011) pp. 156660-156665.

Oono Y, et al.;. Influence of the phosphoric acid-doping level in polybenzimidazole membrane on the cell performance of high-temperature proton exchange membrane fuel cells. Journal of Power Sources, 189 (2009) pp. 943-949.

Krishnan NN, et al.; Henkensmeier D. Phosphoric acid doped crosslinked polybenzimidazole (PBI—OO) blend membranes for high temperatures polymer electrolyte fuel cells. Journal of Membrane Science, 544 (2017)pp. 416-424.

BrandTech Scientific, Inc.; Solvent Boiling Points Chart: https://www.brandtech.com/solventboilingpointschart/ 2020.

Pu H, Wang L, Pan H, Wan D. Synthesis and characterization of fluorine-containing polybenzimidazole for proton conducting membranes in fuel cells. Journal of Polymer Science, 48 (2010) 2115-2122.

Perry KA, More KL, Payzant EA, Meisner RA, Sumpter BG, Benicewicz BC. A comparative study of phosphoric acid-doped m—PBI membranes. Polymer Physics, 52 (2014) 26-35.

International Search report for PCT/DK2021/050008, prepared by the Nordic Patent Institute, dated Apr. 8, 2021, 4 pages.

APPARATUS AND PROCESS FOR MAKING ACID-DOPED PROTON EXCHANGE MEMBRANES

CROSS-REFERENCE TO RELATED APPLICATION

This application is the U.S. national phase of PCT Application No. PCT/DK2021/050008 filed on Jan. 12, 2021, which claims priority to DK Patent Application No. PA 2020 00062 filed on Jan. 20, 2020, the disclosures of which are incorporated in their entirety by reference herein.

FIELD OF THE INVENTION

The present invention relates to a method and apparatus for making acid-doped proton exchange membranes for fuel cells.

BACKGROUND OF THE INVENTION

A polymer electrolyte membrane, abbreviated PEM and also commonly called proton exchange membrane, in combination with an electrode, for example platinum-based electrode, forms a membrane-electrode assembly (MEA), which is one of the key components of a correspondingly named PEM fuel cell. High-temperature PEM fuel cells are more tolerant to the impurities in input gases, especially for carbon monoxide, which is one of the main benefits as compared to low temperature fuel cells. However, high operating temperatures, even up to 200° C., require use of special materials.

As material for a membrane used in a fuel cell at high temperature, a good candidate is polybenzimidazole, PBI, which is a synthetic polymer with aromatic and heteroaromatic rings that has excellent chemical and thermal stability, see also the article by Seland F, Berning T, Boressen B, Tunold R, Improving the performance of high-temperature PEM fuel cells based on PBI electrolyte. Journal of Power Sources, 160 (2006) 27-36, which is reference [1] in the reference list below.

PBI membranes exhibit relatively low proton conductivity, which, however, can be significantly increased by a doping of the membrane polymer with a strong electrolyte. Various mineral acids, for example HBr, HCl, $HClO_4$, $HNO_3$, $H_2SO_4$, $H_3PO_4$ are candidates for this purpose. Orthophosphoric acid $H_3PO_4$ is advantageous in having unique proton conductivity, low vapor pressure, and good chemical stability at elevated temperatures. PBI membranes doped with orthophosphoric acid demonstrate values of through-plane electrical conductivity of up to 0.26 S/cm at 200° C. Nevertheless, it is important to note, that PBI membranes doped with orthophosphoric acid ($H_3PO_4$-PBI) lose their mechanical properties with increasing acid content therein, which is why this parameter must be precisely controlled. See in this respect also the article by Li Q, Jensen J O, Savinell R F, Bjerrum N J, High temperature proton exchange membranes based on polybenzimidazole for fuel cells. Progress in Polymer Science, 34 (2009) 449-477, which is reference [2] in the reference list below.

Typically, casting processes are used for PBI membranes, for example as disclosed in US2012/0115050, US2012/003564, US2008/268321 or WO2000/44816. However, casting processes are not useful for high speed production.

PBI membranes have been discussed in the prior art. For example, US2016/0190625, issued as U.S. Pat. No. 9,705,146, discloses a PBI membrane with a porous layer and a dense layer. U.S. Pat. No. 5,945,233 discloses PBI gel for fuel cells to be deposited on top of electrodes. U.S. Pat. No. 6,042,968 discloses PBI fabrics for fuel cells. The fabric is soaked in acid and then heated to remove residual solvent, like N,N-dimethylacetamide, DMAc. However, the exemplified drying process is slow and in the order of several hours, which is not suitable for large scale production. US2012/0115050 discloses a method where an acid doped PBI membrane is washed to remove acid. However, the necessary stretching of the membrane does not allow a continuous high-speed production, especially not a roll-to-roll process.

US2008/280182 discloses an acid doping stage with a doping time in the range of 5 minutes to 96 hours for highly concentrated phosphoric acid. For the doping, a temperature range of 20-100° C. is disclosed. Exemplified is a doping with phosphoric acid for 95 hours at an acid concentration of 85%. However, such long doping times are not useful for high speed production and not useful for continuous fabrication. No quick process is disclosed.

U.S. Pat. No. 4,927,909 discloses a continuous fabrication of PBI films in general with a step for washing off residual DMAC in a non-solvent bath, for example in water and drying thereafter in oven. As an alternative to the water bath in the washing stage, a bath with up to 15%, but preferably 2-5%, phosphoric acid is disclosed. However, the use for fuel cells is not disclosed and also not any final acid doping.

A continuous process for the mounting of membranes is disclosed in US2008/268321. However, no continuous process is disclosed for the production of the membrane.

EP1566251 discloses a membrane production process, in which the membrane is cast between two supporting bands and then peeled off therefrom.

US2012/031992 discloses a process in which a second membrane is cast on a first membrane for providing a composite membrane. The process is slow in that the membranes are stored for at least a day for conversion of the acid.

US2014/0284269 discloses a method for casting PBI membranes. This is not useful for a continuous process.

Accordingly, there is need for improvements and alternative processes for fast and large scale production.

DESCRIPTION OF THE INVENTION

It is an objective of the invention to provide an improvement in the art. In particular, it is an objective to provide an improved apparatus and method for large scale production. It is also an objective to provide a method for continuous fast production of acid doped polybenzimidazole, PBI, membranes.

These and further objectives are achieved with a continuous automated process and an automated production line for such process as described in the following in detail.

A continuous automated process is described for preparing an acid doped polybenzimidazole, PBI, polymer film membrane for use in a fuel cell. As it will appear in the following, the process has an advantage of being fully automated with a plurality of sequential process stages.

Typically, the process, including production speed, is controlled by a computer with corresponding measurement units that are functionally connected to the computer for measuring various parameters, including gauges that measure temperatures of the various stages and for controlling selected physical properties of the agents that are used in the various process stages, including temperature and acid concentration, as well as other parameters that indicate purity of the agents used for the process. Optionally, also replenishment and discard or recycling of liquids that are used in the process are computer-controlled in order to automatically maintain predetermined conditions for the process.

For the process, a PBI membrane sheet is provided for processing, especially for doping with orthophosphoric acid. Typical thickness parameters for the undoped PBI film membrane sheet for fuel cells are in the range of 20-60 μm Widths and lengths can be in any ranges depending on requirement to design of fuel cell stacks.

Although, in principle, the doped PBI film membrane that is finally used in the fuel cell can be provided as separate sheets that are guided through the processing stages, advantageously, the production appears smoother if the membrane sheet is provided as a quasi-endless film strip from a roll, such as on a first roller, where the film strip is then gradually unrolled from the roll and guided by a plurality of correspondingly arranged further rollers through the various processing stages.

One of the first preparation stages for the membrane sheet is a washing stage where the membrane sheet is exposed to water. Typically, PBI membrane material, if it is coated with solution, contains residuals of organic solvents like. N,N-dimethylacetamide (DMAc), N,N-dimethylformamide (DMF), dimethyl sulfoxide (DMSO) or N-Methyl-2-pyrrolidone (NMP) [2], which should be removed from the membrane material. Clean water, for example deionized water, is efficient for this process. For example, the water is sprayed onto the membrane during its transport through the washing stage, for example during transport as a quasi-endless strip. However, a sufficiently efficient method has been found in guiding the sheet, for example as a quasi-endless strip, through a water bath in which the sheet is submerged. For increasing the efficiency of the washing, a plurality of water baths in corresponding water containers are potentially provided for serial cleaning with increasing cleanliness, although two serially arranged water baths have been found sufficient in experiments for removing solvent from the membrane sheet. It should be noted that the use of DMAc as a solvent for PBI is beneficial compared to other ones, because DMAc has relatively low bong point together with good dissolving power, see also [3, 4] references in the reference list below.

In order to increase the removal of DMAc, a further specific optional cleaning stage has proven efficient. In this optional stage, which is a chemical-reaction stage before the membrane sheet is dried, the membrane sheet is exposed to water-diluted orthophosphoric acid having a concentration in the range of 0.01 wt. % to 1 wt. %. The low concentration of the acid does not lead to any significant doping of the membrane but assists in removing further DMAc from the PBI membrane sheet by chemical reaction of the DMAc with the diluted orthophosphoric acid, which forms acetic acid. Due to the volatility of acetic acid, it is easily dried off the membrane, especially when heating the membrane.

After the removal of DMAc and other impurities in the liquids, the membrane sheet is exposed to a drying procedure. In order to accelerate this process, the membrane is advantageously dried at temperatures elevated above ambient temperature in a drying apparatus. An example is an oven or other type of heating zone in which the temperature can be controlled and adjusted.

Optionally, the drying procedure comprises two drying phases, for example in a first and second zone, respectively, of the drying apparatus.

The first phase of the optional two-phase drying is made in the first zone at a temperature in the range of 1-10 degrees below the boiling point of water, for example in the range of 90-99° C. if the drying is performed at standard atmospheric pressure, where the boiling temperature of water is at 100 degrees. If the drying is made at different pressure, for example under lower pressure conditions, the boiling point of water is correspondingly lower. The drying below the boiling point of water is done in order to evaporate the water without water bubble formation. Bubbles from water vapor in the membrane are unwanted, as this may create voids in the membrane material.

The second phase of the optional two-phase drying is made at a temperature in the range of 1-10 degrees below the boiling point of DMAc, which boils at 166° C. when at standard atmospheric pressure of 100 kPa.

However, for the case that the chemical reaction stage is used after the cleaning with water, acetic acid is produced which forms an azeotropic mixture with DMAc, and for this case, the second phase is advantageously 1-10 degrees below the boiling point of the azeotropic mixture of acetic acid with DMAc in order to evaporate DMAc without bubble formation. The boiling point for such azeotropic mixture of acetic acid with DMAc is at 171° C. of at standard atmospheric pressure.

For acetic acid itself, the standard boiling point is 116° C., a temperature potentially chosen as an additional step between the evaporation of water and the evaporation of DMAc or the azeotropic mixture.

The drying stage is potentially provided as a drying tunnel having gradually smooth or stepwise increasing temperatures in zones so that the membrane sheet, potentially in the form of a membrane strip, is experiencing the increasing temperature while guided through the drying tunnel. Alternatively, the drying stage is provided with multiple subsequent heaters, such as ovens, with different temperatures in order to provide the drying phases.

As an optional stage prior to the doping stage, the preparation line comprises a pre-doping stage between the drying stage and the doping stage. In the pre-doping stage, the membrane sheet is exposed to orthophosphoric acid at a concentration higher than 65 wt. %, for example, in the range of 65-85 wt. %, for dissolving low molecular weight molecules of the PBI polymer of the membrane by the orthophosphoric acid. For example, the pre-doping stage comprises a pre-doping container with such orthophosphoric for guiding the membrane, for example the strip, through the acid in the pre-doping container. By dissolving low molecular weight molecules of the PBI polymer, the membrane polymer comprises dominantly high molecular weight molecules, and the final doping stage is not contaminated by substantial amounts of such dissolved PBI. Useful temperatures of the acid in the pre-doping stage are in the range from 40 to 80° C.

In the doping stage, the PBI membrane sheet, for example the strip, is exposed to orthophosphoric acid at a concentration higher than 85 wt. %, for example in the range 86-99 wt. %, optionally for a duration in the range of 10 seconds to 5 minutes or even less than 5 minutes, for doping the membrane sheet with the acid. For example, the doping stage comprises a doping container with such orthophosphoric acid for guiding the membrane, for example the strip, through the acid in the doping container.

By keeping the temperature high, the time for doping can be adjusted to a suitable time length for the production so that the movement of the membrane sheet, optionally strip, through the doping stage matches the transport speed through the other stages. For example, the orthophosphoric acid in the doping stage is held at a temperature above 75° C., for example in the range of 90-100° C.

It has turned out that the doping in the doping stage can be achieved to a satisfactory doping level in less than 5 minutes or even less than 1 minute for acid concentrations of 90 wt. % by increasing the temperature in the range of 90-100° C., such as in the range of 95-100° C. In experiments with 90 wt. % orthophosphoric acid at 100° C., the necessary doping time was practically less than 1 minute, for example as low as 10-30 seconds.

However, at high temperatures and at high doping levels, there is a risk of disintegration of the membrane material and a corresponding reduction of tensile strength, which is disadvantageous. Especially, it was found that the doping levels advantageously are below 30 mg of orthophosphoric acid per $cm^2$ of the membrane sheet and even more advantageous in the range of 10-15 $mg/cm^2$, because of a transition from monomolecular to polymolecular adsorption around 12 $mg/cm^2$.

For this reason, the combination of parameters, such as acid concentration and temperature as well as the doping time have to be chosen carefully. In experiments with 90 wt. % orthophosphoric acid at temperature of 100° C., a doping time was found of less than 1 minute, for example in the range of 5-30 seconds, while still maintaining sufficient tensile strength of the membrane strip.

For preparation lines where a quasi-endless membrane strip is used, advantageously, a collection roller is employed for collecting the endless strip after doping. Such roller is useful for transporting the doped membrane to the final assembly of fuel cells where the membrane strip is cut into the right dimensions and inserted into the fuel cell between the separator plates.

As mentioned, the produced membrane is useful for high temperature polymer electrolyte membrane fuel cell, (HT-PEM), which operates above 120 degrees centigrade, differentiating HT-PEM fuel cell from low temperature PEM fuel cells, the latter operating at temperatures below 100 degrees, for example at 70 degrees. The normal operating temperature of HT-PEM fuel cells is the range of 120 to 200 degrees centigrade, for example in the range of 160 to 170 degrees centigrade. HT-PEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, for example for automobile industry.

BRIEF DESCRIPTION OF THE DRAWING

The invention will be described in the following with reference to the drawing, in which.

DETAILED DESCRIPTION

In the following, a high-speed roll-to-roll process is described in which production parameters are precisely controlled in order to produce high quality membranes for fuel cells based on polybenzimidazole, PBI, sheet material and doped with orthophosphoric acid $H_3PO_4$. A production line for preparation of $H_3PO_4$-doped PBI membranes with useful properties is presented in the following.

Figure 1:
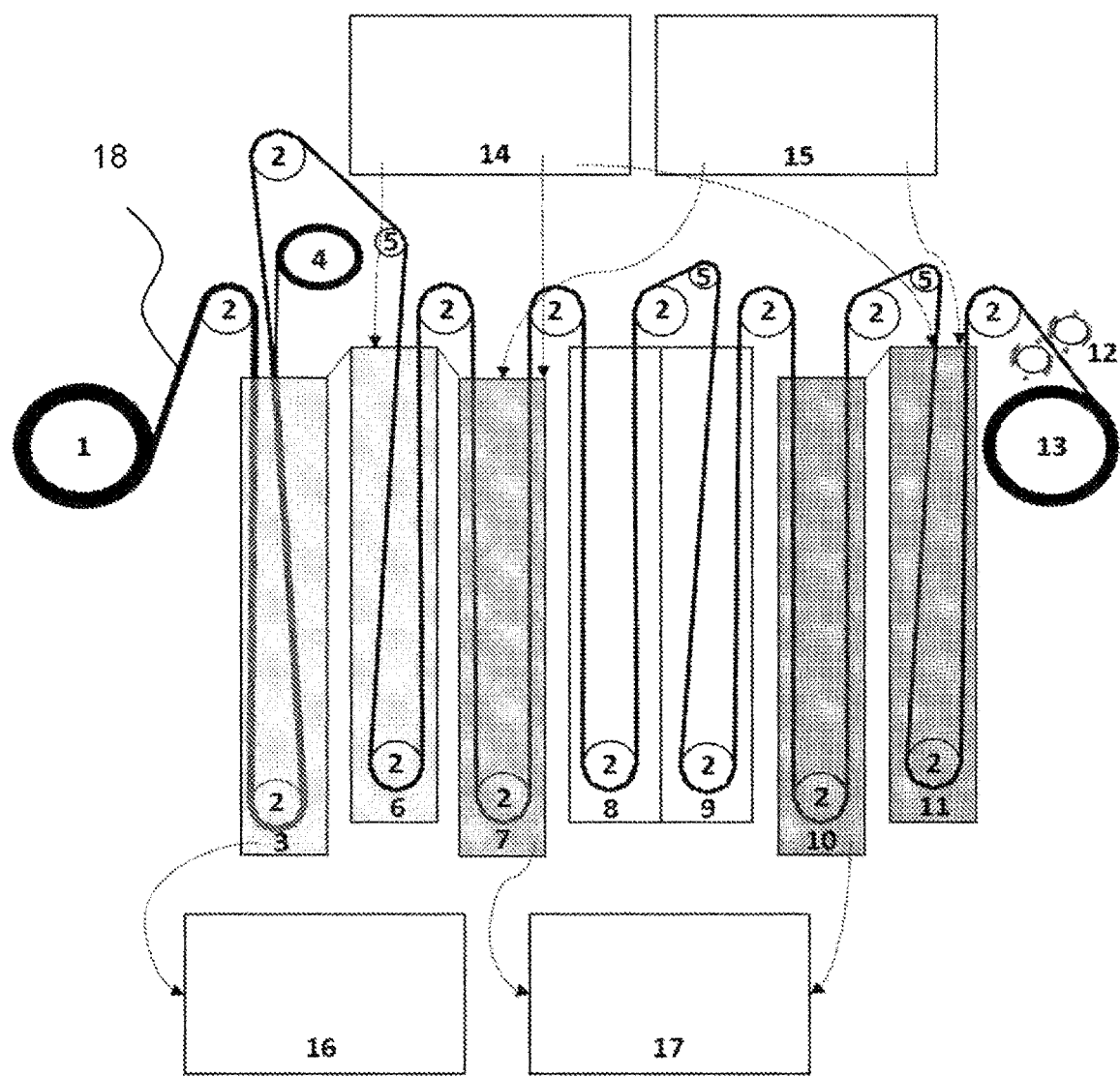
FIG. 1 is a sketch of a continuous process for doping membranes.

FIG. 1 illustrates a general production line, including washing and acid doping of PBI membranes by a roll-to-roll process.

A roll 1 is provided of an undoped quasi-endless strip of PBI membrane sheet material. Optionally, the PBI membrane is provided by casting or coating PBI material onto a polymer film, for example polyester film. The quasi-endless polymer membrane sheet 18 is unwound from the roller 1, and by guiding rollers 2 brought into a container 3 with deionized water. Normally, after coating onto a polymer film, the PBI membrane contains up to 20 wt. % (weight percentage) of solvent, for example including N,N-dimethylacetamide (DMAc), and in the water container 3, the main part of this solvent is removed.

Although, the containers in FIG. 1 are shown as having equal size, this is typically not the case. As the membrane strip is guided over rollers so that all parts of the strip are moving with the same speed, the length of the path through the baths in the various containers 3, 6-11 can be varied by varying the size of the individual containers and, correspondingly, the length of the time it takes for a portion of the membrane strip to pass through a container.

After the water container 3, the PBI membrane only comprises a small content of solvent inside, typically less than 2 wt. %. The membrane is then easily detached from the substrate, for example polyester substrate, which is collected on film collection roller 4.

The quasi-endless membrane strip is guided via tension-controlling roller 5 to a second water container 6 that also contains deionized water. The water in the second container 6 is steadily or periodically replenished in order to keep the concentration of the solvent in the second water container 6 low. The concentration of the removed solvent in the first water container 3 is substantially higher than in the second water container 6 why the water with the low concentration of solvent from the second water container 6 is advantageously used for replenishing the water for the first water container 3, from which the water is then discarded into water receptacle 16, which is optionally a drain or which is used for recycling of the water if combined with corresponding cleaning options. The use of water from the second water container 6 for use in the first water container reduces the overall necessary consumption of water in the process. For example, the replenishing step is continuous during the production process.

Despite the two-step washing of the PBI membrane, it can still contain some residuals of solvent, for example DMAc due to the strong interaction between the polar groups in PBI and the DMAc molecules, see also reference [2].

In order to further remove residuals of solvent, in particular DMAc, a chemical-reaction step is performed in low-acidity container 7, which contains diluted orthophosphoric acid, having a concentration of less than 1 wt. % in water.

An exact concentration of the orthophosphoric acid in container 7 is defined by the volume of container 7 used and the volume of membrane rolled through the container per specified time. In this container, a chemical reaction takes place between the solvent, in particular DMAc, and the orthophosphoric acid. For DMAc as the solvent, the process forms acetic acid, which is described by the equation below, where DMAc is marked here as $CH_3CON(CH_3)_2$).

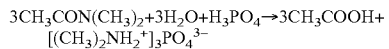

This washing in container 7 removes the solvent, in particular DMAc. This is important as this process prevents the products of the acid hydrolysis of DMAc from getting into the fuel cell stack.

Before the final doping, the PBI membrane should be dried from all liquids besides orthophosphoric acid, especially the water, possibly remaining trace amounts of DMAc and acetic acid, which have boiling points 100, 166 and 118° C. at standard pressure, respectively, see also reference [5]. Also, other reaction products should be removed. It is pointed out in EP1551522, equivalent to US2004/000470, that acetic acid forms an azeotropic mixture with DMAc, which boils at 171° C.

Advantageously, in order to obtain proper drying results, a two-zone oven 8 and 9 is used with a first zone, in which the temperature is kept around 100° C. for removing water, and a second zone at around 171° C. for removing the acetic acid-DMAc mixture.

In order to avoid bubbles from boiling of the liquids, which could produce voids in the membrane, the temperature in the first container is maintained at a temperature just below 100° C., for example in the range of 90-98° C., and in the second zone just below 171° C., for example in the range 160-170° C. By gradually increasing the temperature, for example in a multi zone drying tunnel, evaporation of the various liquids can be achieved without bubble formation.

After the drying process, the dried PBI membrane is moved through two subsequent containers 10, 11 with concentrated orthophosphoric acid. The concentration in the first acid container 10 is above 65 wt. % but not necessarily as high as in second acid container, as the second container is used for the final doping of the membrane. The first acid container 10 is kept at elevated temperatures in the range of 40-80° C.

The role of the first acid container 10 is explained in the following. Normally, PBI has some spread in the molecular weight of the polymer so that both polymer with low molecular weight and with high molecular weight are present. The PBI polymer with low molecular weight will be at least partially dissolved in hot concentrated orthophosphoric acid. In order to optimize the doping process, two containers 10 and 11 are used, where the dissolution of PBI polymer with low molecular weight takes place dominantly or entirely in the first container 10, which during the dissolution process attains a lower concentration of acid than the acid concentration desired in the second container 11. As polymer with low molecular weight are dominantly removed in the first container 10, the membrane contains dominantly polymer with higher molecular weight when entering the second container 11. Accordingly, in the second container 11, the acid is maintained at a higher concentration due to a lower degree of contamination by dissolved polymer residuals. The higher concentration is advantageous for the doping, as will be explained in more detail further below.

All in all, the use of the cascade system of containers 10 and 11 assists in regenerating an optimized doping solution.

After doping of the PBI membrane with orthophosphoric acid in doping container 11, the $H_3PO_4$-PBI drops of acid on the membrane are removed by sponge-covered rollers 12, and the doped membrane is wound onto roller 13.

The concentration of DMAc and acetic acid in the water container 3 and the chemical-reaction container 7 should be controlled to avoid over-contamination of the working solution. If necessary, liquids are removed into waste containers 16, 17.

It is important to control the concentration of orthophosphoric acid in the chemical reaction container 7 for the cleaning of the membrane, in the pre-doping container 10 for the reduction of low-molecular weight polymer, and in doping container 11 for carrying-out of the overall complex doping process. Therefore, a first replenish container 14 with deionized water and a second container 15 with 99 wt. % $H_3PO_4$ are utilized to adjust the liquids to predetermined concentration levels in the various corresponding containers for the process.

Water contaminated with DMAc and orthophosphoric acid contaminated with products of hydrolysis of DMAc are collected in waste containers 16 and 17, respectively, for their further recycling.

Returning to the doping process and its mechanism, it should be mentioned here that doping of PBI with orthophosphoric acid occurs via bonding of one repeating unit of the polymer with two molecules of acid by means of coulombic forces. Further accumulation of acid within PBI membrane takes place due to the hydrogen bonds, see also reference [2]. Process parameters such as time, temperature, and concentration of orthophosphoric acid must be carefully considered in order to reach optimized and consistent doping levels and in order for the membrane not to lose its tensile strength. This is discussed in greater detail in the following with reference to experimental results.

Figure 2:
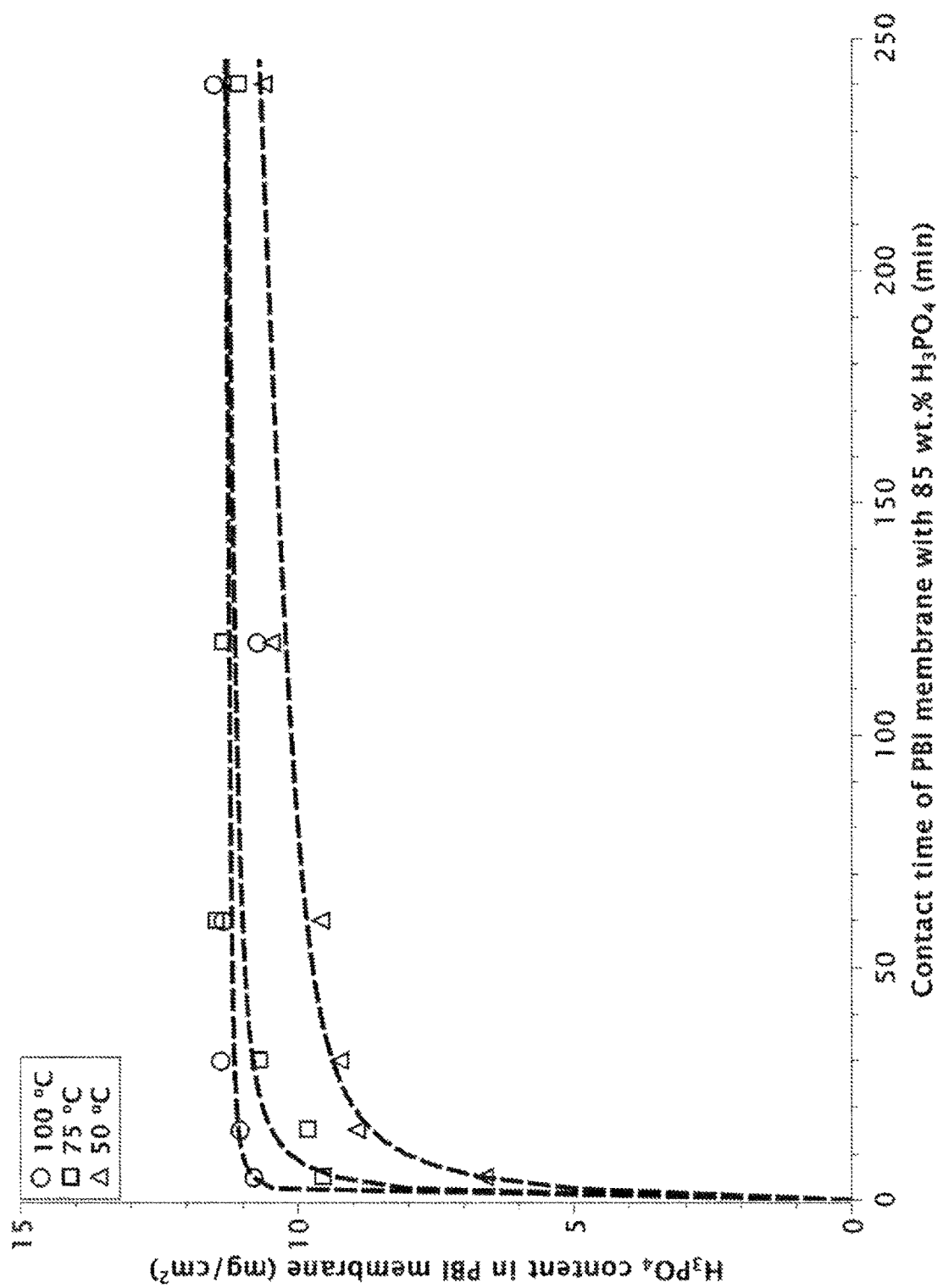
FIG. 2 is a graph for adsorption isotherms for PBI membranes in 85 wt. % $H_3PO_4$ at different temperatures.

FIG. 2 illustrates adsorption isotherms for PBI membranes in 85 wt. % $H_3PO_4$ at temperatures of 50° C., 75° C., and 100° C. In order to reach a plateau region for the content of orthophosphoric acid, at least 2 h of doping time are necessary at 50° C. when doped in a 85 wt. % orthophosphoric acid solution. A reduced doping time of 30 mins is necessary at 75° C., while less than 5 min can be used at 100° C. to reach a plateau region. For a fast production process, a short doping time is highly advantageous.

In order to reduce the doping time even more, the concentration of orthophosphoric acid is advantageously higher than 85 wt. %.

Figure 3:
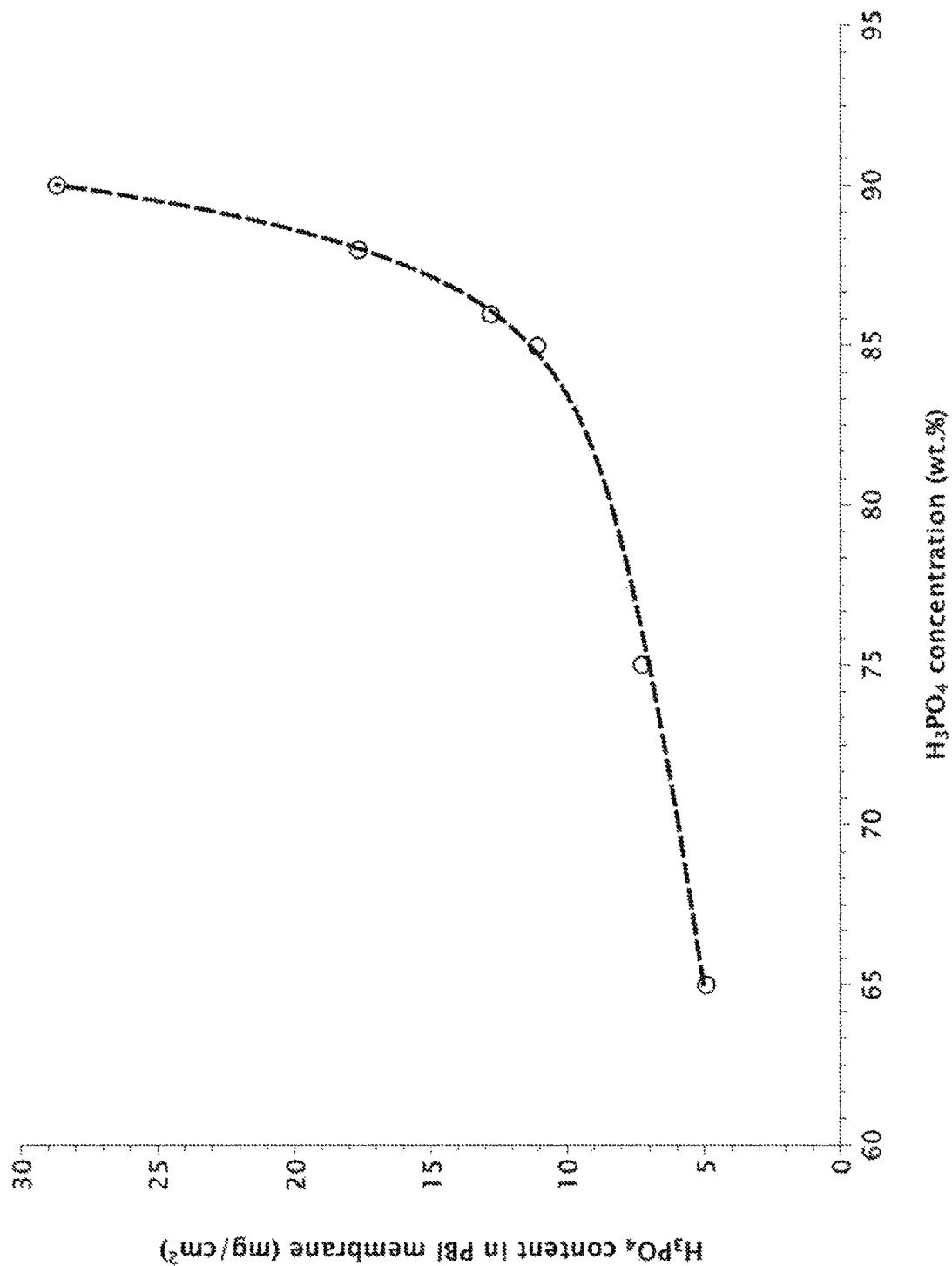
FIG. 3 is a graph for content of $H_3PO_4$ absorbed by PBI membranes depending on its concentration at 100° C. for 1 min.

FIG. 3 shows the amount of orthophosphoric acid adsorbed by PBI membranes when doping at 100° C. for various concentrations of $H_3PO_4$ in the range of 65 to 90 wt. %. It should be noted that process time is fixed there on 1 min.

According to FIG. 3, the doping level is exponentially growing and exceeding the values of maximal adsorption in FIG. 1, approximately 11.5 mg/cm². The strong growth is due to the change of the mechanism from monomolecular type to polymolecular adsorption. In the polymolecular adsorption regime, the PBI membrane film becomes gel-like. A pronounced gel-formation effect was observed at doping levels around 30 mg/cm². At even higher levels, the membrane is dissolved in orthophosphoric acid.

Experimentally, it was shown that use of orthophosphoric acid with concentration levels above 85 wt. %, in particular at 90 wt. %, allowed a reduction of the doping time to 10 sec.

Figure 4:
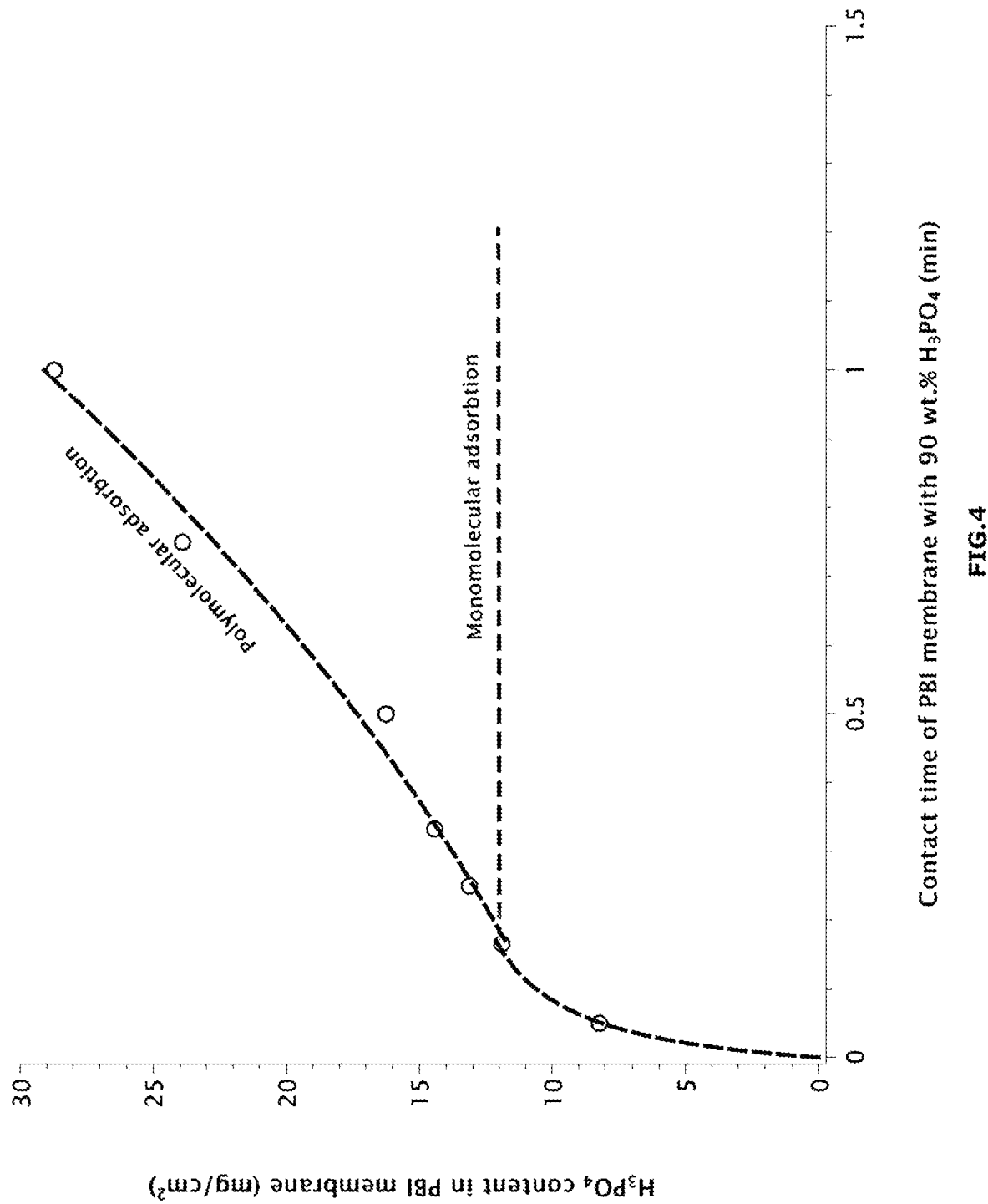
FIG. 4 is a graph for adsorption isotherms for PBI membranes in 90 wt. % $H_3PO_4$ at 100° C.

With reference to FIG. 4, showing adsorption isotherms for PBI membranes in 90 wt. % $H_3PO_4$ at 100° C., the transition from a monomolecular mechanism of adsorption to a polymolecular mechanism is clearly observed in the range of 10-15 mg/cm². An illustrative transition level of 12 mg/cm² is indicated in FIG. 4.

Thus, when implementing such accelerated doping procedure, care must be taken that the PBI membrane still has sufficient tensile strength. In order to verify this, the highly doped PBI membranes were compared to PBI membranes that were doped in mild conditions, i.e. at 2 h at 50° C. in 85 wt. % $H_3PO_4$. Experimental results are illustrated in FIG. 5.

Figure 5:
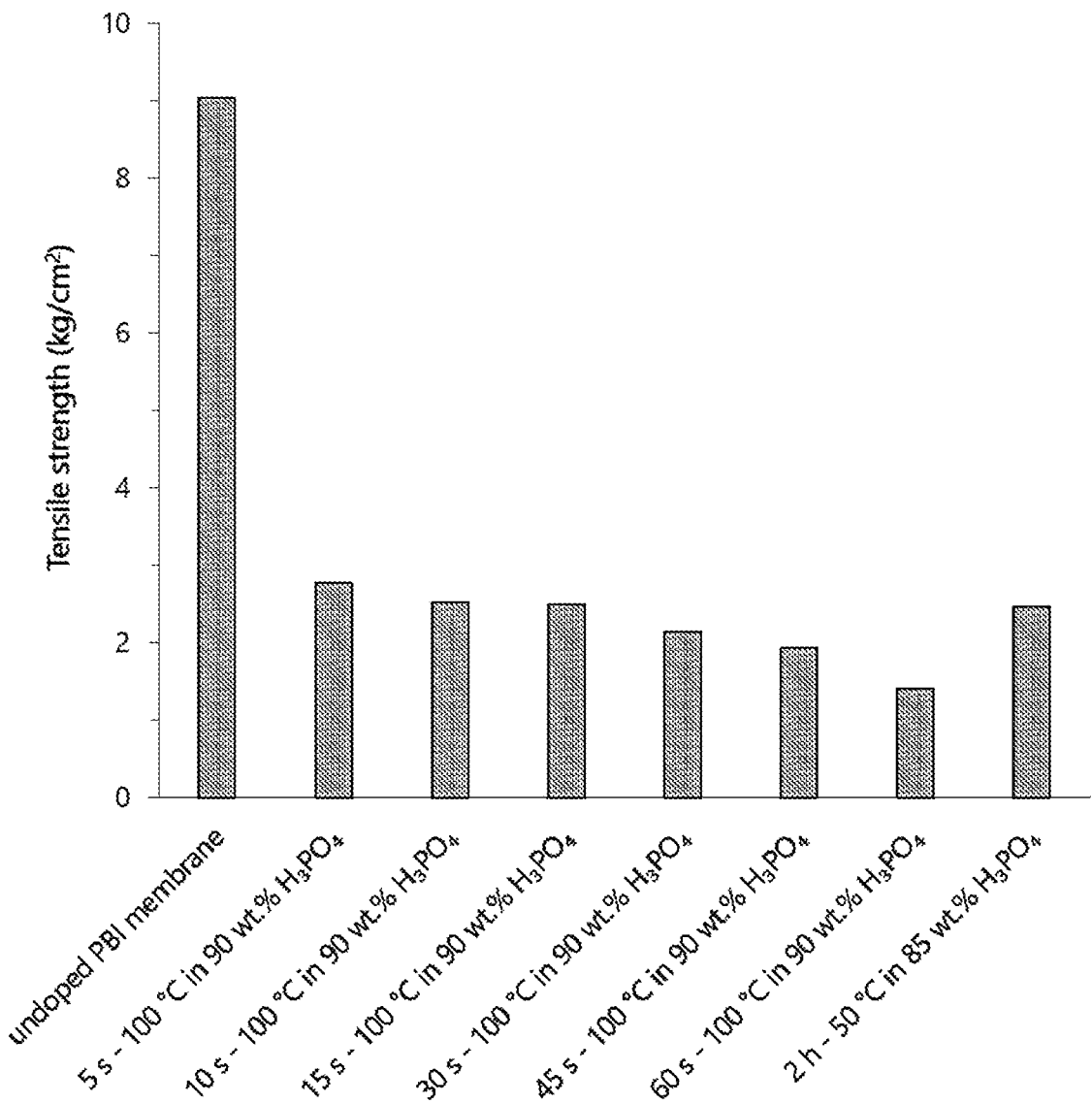
FIG. 5 illustrates tensile strength of PBI membranes before and after doping with different process parameters.

As seen from FIG. 5, the experimentally produced membranes doped at high temperature of 100° C. and high acid concentration of 90 wt. % have a tensile strength at least as high as membranes doped slowly at a low temperature of 50° C. and in more moderate acid concentration of 85 wt. %. This is the case, however, only as long as the doping time is not more than 15 s. After 15 seconds, the tensile strength becomes lower, although only moderately lower until 45 seconds and still acceptable up to 1 minute.

This is in agreement with FIG. 4, where the transition from monomolecular to polymolecular adsorption regime occurs between 12 and 18 seconds.

As a conclusion, a process has been demonstrated in which through multi-step cleaning of the membrane material and careful adjustment of the parameters results in doping content and tensile strengths of the membrane similar to slow doping processes, however, where the process is much more suitable for large scale production due to its much higher speed. In particular, the proposed fast-doping process for PBI membrane with orthophosphoric acid can be automated and used as part of continuous production for fuel cells.

In order to summarize in comparison with some prior art, the following features are pointed out:

1) washing PBI membrane in a diluted solution of orthophosphoric acid in order to decompose the residuals of DMAc and make the drying process fast and efficient, which is different from the disclosures in references [7, 8] where casted PBI membranes are merely washed in non-solvents, such as water and/or alcohols, which is while drying in those cases requires long time to remove DMAc bonded to PBI, for example drying at 80 degrees centigrade for 12 h, see reference [6];

2) using a two-zone oven to safely remove the various liquid components with different boiling points from the PBI membrane, while also avoiding bubble formation therein;

3) keeping the adsorption in monomolecular state by strictly controlling the process parameters, for example at 100 degrees centigrade in 90 weight percent H3PO4 for less than 1 min, for example in the range of 10-15 sec, for maintaining its mechanical properties after doping, which is different from the disclosures in references [10-14] where the PBI membranes are doped in more diluted solutions of orthophosphoric acid and at lower temperatures, which takes hours and therefore is not suited for fast large scale production.

REFERENCES

[1] Seland F, Berning T, Boressen B, Tunold R. Improving the performance of high-temperature PEM fuel cells based on PBI electrolyte. Journal of Power Sources, 160 (2006) 27-36

[2] Li Q, Jensen J O, Savinell R F, Bjerrum N J. High temperature proton exchange membranes based on polybenzimidazole for fuel cells. Progress in Polymer Science, 34 (2009) 449-477

[3] Li X, Qian G, Chen X, Benicewicz B C. Synthesis and characterization of a new fluorine-containing polybenzimidazole (PBI) for proton-conducting membranes in fuel cells. Fuel Cells, 13 (2013) 832-842

[4] Pu H, Wang L, Pan H, Wan D. Synthesis and characterization of fluorine-containing polybenzimidazole for proton conducting membranes in fuel cells. Journal of Polymer Science, 48 (2010) 2115-2122

[5] Solvent Boiling Points Chart: https://www.brandtech.com/solventboilingpointschart/[6]

[6] Shen C H, Jheng L C, Hsu S L C, Wang J T W. Phosphoric acid-doped cross-linked porous polybenzimidazole membranes for proton exchange membrane fuel cells. Journal of Materials Chemistry, 21 (2011) 156660-156665

[7] Oono Y, Sounai A, Hori M. Influence of the phosphoric acid-doping level in polybenzimidazole membrane on the cell performance of high-temperature proton exchange membrane fuel cells. Journal of Power Sources, 189 (2009) 943-949

[8] Krishnan N N, Joseph D, Duong N M H, Konovalova A, Jang J H, Kim H J, Nam S W, Henkensmeier D. Phosphoric acid doped cross-linked polybenzimidazole (PBI-OO) blend membranes for high temperatures polymer electrolyte fuel cells. Journal of Membrane Science, 544 (2017) 416-424

[9] Kurungot S, Illathvarappil R, Bhange N, Unni S M. Process for the preparation PBI based electrode assembly (MEA) with improved fuel cell performance and stability. Patent U.S. Pat. No. 10,361,446B2, filed 9 Dec. 2004

[10] Perry K A, More K L, Payzant E A, Meisner R A, Sumpter B G, Benicewicz B C. A comparative study of phosphoric acid-doped m-PBI membranes. Polymer Physics, 52 (2014) 26-35

The invention claimed is:

1. A continuous automated process for preparing an acid doped polybenzimidazole, PBI, polymer film membrane sheet for use in a fuel cell, the automated process comprising the following sequences:
   providing a PBI film membrane sheet from a roll as an endless strip and continuously moving the endless strip over rollers through the various stages for processing;
   in a washing stage, exposing the membrane sheet to water for removing one or more solvents from the membrane sheet by the water;
   in a drying procedure, drying the membrane sheet at temperatures elevated above ambient temperature; and
   in a doping stage, after the drying procedure, exposing the PBI membrane sheet for a duration in the range of 10 seconds to 5 minutes to orthophosphoric acid at a concentration higher than 85 wt. % at a temperature in the range of 90-100° C. for doping the membrane sheet with the acid.

2. The process according to claim 1, comprising removing N,N-dimethylacetamide DMAc as solvent from the membrane sheet by the water in the washing stage;
   wherein the drying procedure comprises two drying phases, wherein the first drying phase is made at a temperature in the range of 1-10 degrees below the boiling point of water in order to evaporate water without bubble formation, and wherein the second drying phase is made at a temperature in the range of 1-10 degrees below the boiling point of DMAc or 1-10 degrees below the boiling point of an azeotropic mixture of acetic acid with DMAc for evaporating DMAc without bubble formation.

3. The process according to claim 1, wherein the method comprises, removing N,N-dimethylacetamide DMAc as solvent from the membrane sheet by the water in the washing stage, and in a chemical-reaction stage, between the washing stage and the drying stage, exposing the membrane sheet to water-diluted orthophosphoric acid having a concentration in the range of 0.01 wt. % to 1 wt. % for removing further DMAc from the PBI membrane sheet by chemical reaction of the DMAc with the diluted orthophosphoric acid to form acetic acid.

4. The process according to claim 1, wherein the method comprises, in a pre-doping stage, between the drying stage and the doping stage, exposing the membrane sheet to orthophosphoric acid at a concentration higher than 65 wt. % but lower than the concentration at the doping stage and dissolving low molecular weight molecules of the PBI polymer of the membrane by the orthophosphoric acid.

5. The process according to claim 1, wherein the method comprises providing the various stages as liquid baths in corresponding containers and submerging the membrane sheet in the liquid.

6. An automated production line for use in a continuous automated process according to claim 1, the production line comprising,
a sheet receiver for receiving a polybenzimidazole, PBI, film membrane sheet;
a washing stage for exposing the membrane sheet to water and removing solvent from the membrane sheet by the water;
a drying apparatus for drying the membrane sheet at temperatures elevated above ambient temperature;
a doping stage after the drying apparatus for exposing the PBI membrane sheet to orthophosphoric acid at a concentration higher than 85 wt. % for doping the membrane sheet with the acid at a temperature in the range of 90-100° C. and for performing the doping in the doping stage in the range of 10 seconds to 5 minutes or 10 seconds to less than 5 minutes;
wherein the sheet receiver is configured for receiving the sheet from a roll as an endless strip over rollers for continuously moving the endless strip through various stages
wherein the automated production line in the continuous automated process is configured for providing the orthophosphoric acid in the doping stage at a temperature in the range of 90-100° C. and for performing the doping in the doping stage in the range of 10 seconds to 5 minutes or 10 seconds to less than 5 minutes.

7. The production line of claim 6, comprising a first roll for receiving an endless strip of PBI membrane sheet and a plurality of correspondingly arranged further rollers for unrolling the strip from the first roll while guiding the strip over the further rollers through the various preparation stages in a sequence as described in the following:
one or more water containers with water as part of the washing stage for washing the strip by guiding the strip through the water in the water containers;
a chemical-reaction stage comprising a diluted-acid container with water-diluted orthophosphoric acid having a concentration in the range of 0.01 wt. % to 1 wt. % for removing N,N-dimethylacetamide DMAc from the PBI membrane sheet after the washing stage and by chemical reaction of the DMAc with the diluted orthophosphoric acid to form acetic acid by guiding the strip through the diluted acid in the diluted-acid container.

8. The production line according to claim 7, comprising a first zone and a second zone of the drying apparatus with two corresponding drying phases for drying the strip while guided through the first and then the second zone, wherein the first zone is programmed to provide a drying temperature in the range of 1-10 degrees below the boiling point of water in order to evaporate water without bubble formation in the first drying phase, and wherein the second zone is programmed to provide a temperature in the range of 1-10 degrees below the boiling point of DMAc or 1-10 degrees below the boiling point of an azeotropic mixture of acetic acid with DMAc for evaporating DMAc without bubble formation in the second drying phase.

9. The production line according to claim 6, comprising a pre-doping container as part of a pre-doping stage with orthophosphoric acid at a concentration higher than 65 wt. % for dissolving low molecular weight molecules of the PBI polymer of the membrane by the orthophosphoric acid by guiding the strip through the acid in the pre-doping container (10);
a doping container as part of the doping stage with orthophosphoric acid at a concentration higher than 85 wt. % for doping the membrane sheet with the acid by guiding the strip through the acid in the doping container after the pre-doping stage.

10. The production line of claim 6, comprising a first roll for receiving an endless strip of PBI membrane sheet and a plurality of correspondingly arranged further rollers for unrolling the strip from the first roll while guiding the strip over the further rollers through the various preparation stages in a sequence as described in the following:
one or more water containers with water as part of the washing stage for washing the strip by guiding the strip through the water in the water containers;
a chemical-reaction stage comprising a diluted-acid container with water-diluted orthophosphoric acid having a concentration in the range of 0.01 wt. % to 1 wt. % for removing further DMAc from the PBI membrane sheet by chemical reaction of the DMAc with the diluted orthophosphoric acid to form acetic acid by guiding the strip through the diluted acid in the diluted-acid container;
a first zone and a second zone of the drying apparatus with two corresponding drying phases for drying the strip while guided through the first and then the second zone, wherein the first zone is programmed to provide a drying temperature in the range of 1-10 degrees below the boiling point of water in order to evaporate water without bubble formation in the first drying phase, and wherein the second zone is programmed to provide a temperature in the range of 1-10 degrees below the boiling point of DMAc or 1-10 degrees below the boiling point of an azeotropic mixture of acetic acid with DMAc for evaporating DMAc without bubble formation in the second drying phase;
a pre-doping container as part of a pre-doping stage with orthophosphoric acid at a concentration higher than 65 wt. % for dissolving low molecular weight molecules of the PBI polymer of the membrane by the orthophosphoric acid by guiding the strip through the acid in the pre-doping container;
a doping container as part of the doping stage with orthophosphoric acid at a concentration higher than 85 wt. % for doping the membrane sheet with the acid by guiding the strip through the acid in the doping container;
a collection roller for collecting the endless strip after doping.

* * * * *

UNITED STATES PATENT AND TRADEMARK OFFICE
CERTIFICATE OF CORRECTION

| | |
|---|---|
| PATENT NO. | : 11,646,433 B2 |
| APPLICATION NO. | : 17/793188 |
| DATED | : May 9, 2023 |
| INVENTOR(S) | : Mads Bang et al. |

It is certified that error appears in the above-identified patent and that said Letters Patent is hereby corrected as shown below:

On the Title Page

After:
"(65) Prior Publication Data
US 2023-0057508 A1 Feb. 23, 2023"

Add Item (30):
-- (30) Foreign Application Priority Data
Jan. 20, 2020 DK PA 2020 0062 --.

Signed and Sealed this
Second Day of July, 2024

Katherine Kelly Vidal
*Director of the United States Patent and Trademark Office*